United States Patent [19]

Terui et al.

[11] 4,408,854
[45] Oct. 11, 1983

[54] AUTOMATIC FOCUS DETECTING APPARATUS OF A CAMERA

[75] Inventors: Nobuhiko Terui, Tokyo; Sakuji Watanabe, Warabi, both of Japan

[73] Assignee: Nippon Kogaku K.K., Tokyo, Japan

[21] Appl. No.: 339,660

[22] Filed: Jan. 15, 1982

[30] Foreign Application Priority Data

Feb. 3, 1981 [JP] Japan ............................. 56-13220[U]

[51] Int. Cl.³ .............................................. G03B 3/00
[52] U.S. Cl. ........................................ 354/25; 354/31
[58] Field of Search .................................... 354/25, 31

[56] References Cited

U.S. PATENT DOCUMENTS 3,967,056 6/1976 Yata et al. ............................ 354/25

Primary Examiner—Michael L. Gellner
Attorney, Agent, or Firm—Fitzpatrick, Cella, Harper & Scinto

[57] ABSTRACT

An automatic focus detecting apparatus of a camera comprises a focus detecting unit for receiving the light from an object to be photographed and producing a focus detection output, a driving circuit responsive to the focus detection output to effect at least one of the driving of a phototaking lens and focus condition display, an object brightness detecting unit for producing a brightness detection output corresponding to the brightness of the object, means for producing a time count starting signal, a timer circuit adapted to start time count in response to the time count starting signal and produce a blocking signal in response to the brightness detection output for a short time if the brightness is high or for a long time if the brightness is low, and a blocking circuit for preventing the driving circuit from responding to the focus detection output during the time the blocking signal is produced.

5 Claims, 3 Drawing Figures

AUTOMATIC FOCUS DETECTING APPARATUS OF A CAMERA

BACKGROUND OF THE INVENTION

1. Field of the Invention

This invention relates to an automatic focus detecting apparatus.

2. Description of the Prior Art

There are single lens reflex cameras of the type in which the light from an object passed through a phototaking lens is directed to the light-receiving portion of a focus detecting unit by an optical system such as a quick return mirror. In such cameras, during exposure of film, the optical system is moved to make the light-receiving portion dark. After completion of the exposure, the optical system is returned to its original position and the object light again enters the light-receiving portion, but if the object brightness is low, there is a disadvantage that the focus detecting unit is unstable for a long period and effects improper focus detection display and automatic focus adjustment operation during this period. Not only the TTL type automatic focus detecting apparatus, as described above, but also an automatic focus detecting apparatus of the type which carries out focus detection from the information of the object light, suffers from a disadvantage that if the object brightness is low, even upon the closing of the main switch, the apparatus remains unstable for a long period and effects improper focus detection display and automatic focus adjustment operation during this period.

SUMMARY OF THE INVENTION

It is an object of the present invention to eliminate the above-noted disadvantages and to provide an automatic focus detecting apparatus which, after the focus detecting operation of the focus detecting unit has been started, prevents focus adjustment and/or display operation for a short time if the object brightness is high and for a long time if the object brightness is low.

The invention will become fully apparent form the following detailed description of an embodiment thereof taken in conjunction with the accompanying drawings.

DESCRIPTION OF THE PREFERRED EMBODIMENT

Figure 1:
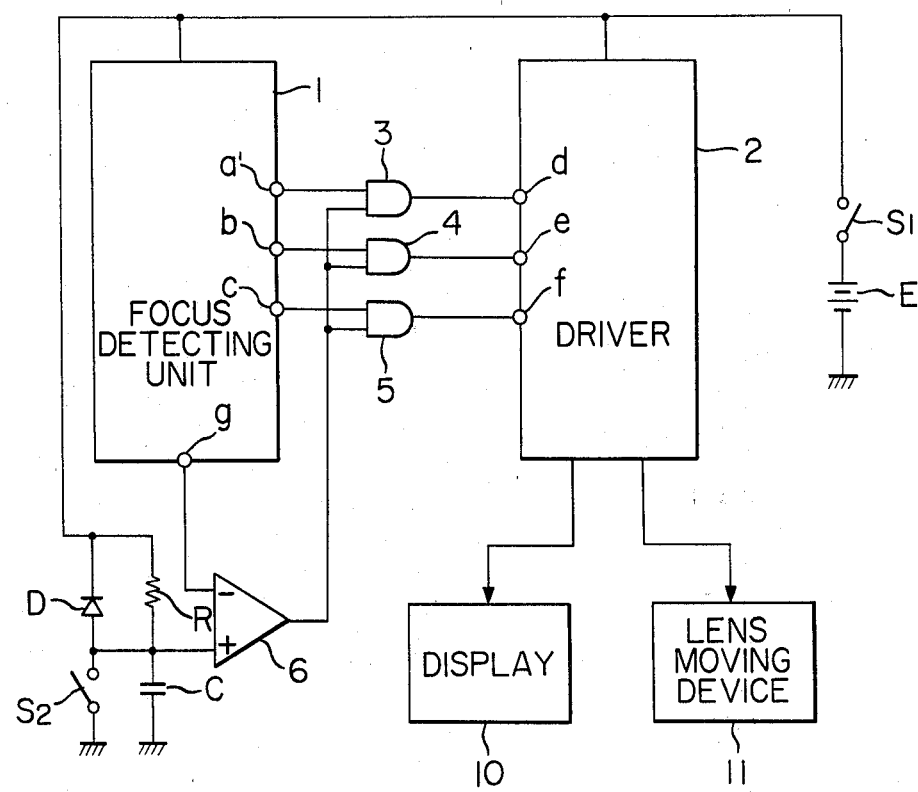
FIG. 1 is a circuit diagram showing an embodiment of the automatic focus detecting apparatus according to the present invention.

FIG. 1 shows an embodiment of the automatic focus detecting apparatus according to the present invention. The light from an object to be photographed passes through a phototaking lens, not shown, is directed by an optical system such as a reflecting mirror or the like, enters the light-detecting portion of a conventional focus detecting unit 1 and is detected there. The focus detecting unit 1 detects whether the object image by the phototaking lens lies on a predetermined focal plane such as a film (hereinafter this will be referred to as the in-focus) or forwardly or rearwardly of the predetermined focal plane (hereinafter these will be referred to as the front focus and the rear focus, respectively), and produces high (Hi) level output voltages as front focus signal, rear focus signal and in-focus signal at output terminals a, b and c during the front focus, the rear focus and the in-focus, respectively. An output voltage related to the object brightness is produced at an output terminal g and more specifically, that output voltage becomes higher as the object brightness becomes lower. The front focus signal from the output terminal a, the rear focus signal from the output terminal b and the in-focus signal from the output terminal c are respectively applied as inputs to the input terminals d, e and f of a driver 2 through AND gates 3, 4 and 5. The driver 2 drives a display device 10 and a phototaking lens moving device 11 in response to the output signal of the focus detecting unit 1. More particularly, when it receives the front focus signal and the rear focus signal, the driver 2 drives the display device 10 to cause it to display the front focus and the rear focus, respectively, while, at the same time, it drives the phototaking lens moving device 11 to cause it to move the phototaking lens toward the in-focus position. Also, when it receives the in-focus signal, the driver 2 causes the display device 10 to display the in-focus and stops the movement of the phototaking lens by the moving device 11. A resistor R, a capacitor C and a comparator 6 together constitute a timer circuit. The AND gates 3, 4 and 5 together constitute a blocking circuit. This blocking circuit 3, 4, 5, in response to the charging voltage of the capacitor C of the timer circuit R, C, 6 and the output voltage of the terminal g of the focus detecting unit 1, prevents the driving circuit 2 from responding to the output of the focus detecting unit 1. A main switch $S_1$ is for supplying the voltage of a power source E to the apparatus. This automatic focus detecting apparatus further includes a diode D and an interlocking switch $S_2$. The diode D causes the capacitor C to discharge its charge when the main switch $S_1$ is open. The interlocking switch $S_2$ is opened and closed in response to movement of an optical system for directing the object light to the light-receiving portion of the focus detecting unit 1.

Figure 2:
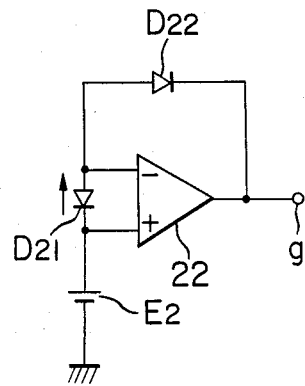
FIG. 2 is a circuit diagram showing an object brightness detecting device included in the focus detecting unit shown in FIG. 1.

FIG. 2 shows an object brightness detecting device included in the focus detecting unit 1 shown in FIG. 1. This brightness detecting device comprises a photodiode $D_{21}$, an operational amplifier 22 forming a head amplifier, a diode $D_{22}$ for logarithmic compression and a reference voltage source $E_2$. The photodiode $D_{21}$ receives the light from the object, and the head amplifier produces an output voltage corresponding to the object brightness at the output terminal g of the focus detecting unit 1. That is, when the light from the object does not enter the photodiode $D_{21}$ and the photodiode is in dark state, the anode voltage of the photodiode $D_{21}$ is lower than the cathode voltage thereof and therefore, the head amplifier 22 produces a Hi level output at the output terminal g. When the light from the object enters the photodiode $D_{21}$, a photocurrent begins to flow through the photodiode $D_{21}$ and therefore, the anode voltage gradually becomes approximate to the cathode voltage and accordingly, the voltage produced at the output terminal g by the head amplifier gradually lowers and becomes stable at a certain predetermined level. The voltage produced at the output terminal g by this head amplifier 22 is such as indicated by curve A or A' in FIG. 3. The curve A corresponds to a case where the light entering the photodiode $D_{21}$ is weak, namely, a case where the object brightness is low. The curve A' corresponds to a case where the object brightness is high. When the object brightness is low, the photocurrent flowing through the photodiode $D_{21}$ becomes small and the potential difference thereacross becomes great and the voltage produced at the output terminal g by the head amplifier 22 lowers slowly as indicated by the curve A and becomes stable at a high level. Conversely, when the object brightness is high, the photocurrent flowing through the photodiode $D_{21}$ becomes great and the potential difference thereacross becomes small and the voltage produced at the output terminal g by the head amplifier quickly becomes stable at a low level as indicated by the curve A'.

Figure 3:
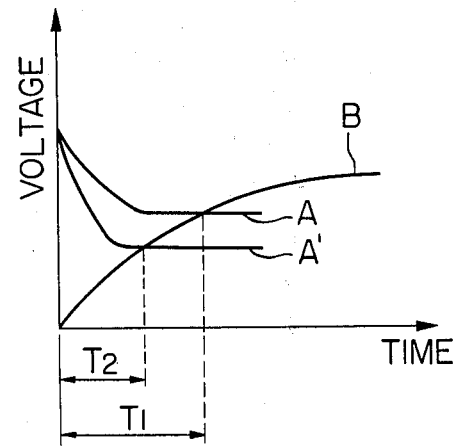
FIG. 3 is a graph illustrating the signals of the FIG. 1 apparatus.

Although FIG. 3 typically shows the output voltage curves A and A' only, the voltage at the output terminal g continuously varies in accordance with the magnitude of the brightness and presents a curve similar to the curve A or A' in accordance with the brightness.

Operation of the apparatus will now be described.

The light from the object passes through the phototaking lens and is directed to the light-receiving portion of the focus detecting unit 1 by an optical system such as a reflecting mirror in the phototaking light path. At this time, the switch $S_2$ is opened in response to the said optical system. In this condition, the main switch $S_1$ is closed to supply the voltage of the power source E to the entire apparatus and start the focus detecting operation. The power source E begins to charge the capacitor C through the resistor R of the timer circuit. That is, this closing of the main switch $S_1$ provides the time count starting signal of the timer circuit. The charging voltage of the capacitor C increases as indicated by curve B in FIG. 3. The origin indicates the focus detection starting time point, namely, the time point whereat the switch $S_1$ is closed. Where the object is of low brightness, as mentioned hereinbefore, a voltage as shown by curve A in FIG. 3 is produced at the output terminal g of the focus detecting unit 1. Accordingly, the voltage at the terminal g is higher than the charging voltage of the capacitor C during the time period from the origin to the point whereat the curve B intersects the curve A and therefore, the comparator 6 applies a low (Lo) level output voltage to the AND gates 3, 4 and 5. Accordingly, all of the outputs of these AND gates 3, 4 and 5 assume a Lo level independently of the outputs from the terminals a, b and c of the focus detecting unit 1. In this manner, during the time the focus detecting unit 1 is unstable after the closing of the main switch, the focus detection output of the focus detecting unit 1 is intercepted by the blocking circuit 3, 4,5 and the driver 2 is prevented from responding to the focus detecting unit 1. When the timer circuit R, C, 6 counts a predetermined time $T_1$, the curve A and the curve B intersect each other and the charging voltage of the capacitor C becomes higher than the voltage at the output terminal g. By this, the output of the comparator 6 is inverted to Hi level to open the AND gates 3, 4 and 5. These AND gates respectively transmit the voltage signals of the terminals a, b and c to the input terminals d, e and f of the driver 2, and in response to the focus detecting unit 1, the driver 2 causes the display device 10 to effect the display of the front focus, the rear focus and the in-focus and causes the phototaking lens moving device 11 to drive the lens. Of course, the count time of the timer circuit R, C, 6, namely, the time $T_1$ required until the curves A and B intersect each other, is selected to a value equal to or greater than the time required for the focus detecting unit 1 to become stable.

Also, when the object brightness is high, the focus detecting unit 1 becomes stable in a short period after the focus detecting operation has been started. In this case, the head amplifier 22 shown in FIG. 2 produces a voltage as indicated by curve A' in FIG. 3 at the terminal g of the focus detecting unit 1. This voltage quickly becomes stable at a low level and therefore, the period $T_2$ from the origin to the point whereat the curve A' and the curve B intersect each other, namely, the period from the time point whereat the focus detecting operation is started till the time point whereat the prevention of the response of the driver 2 to the focus detecting unit 1 is released, is shortened.

Subsequently, in response to the shutter release operation, the optical system for directing the object light to the light-receiving portion of the focus detecting unit 1 moves and the light incident on the light-receiving portion of the focus detecting unit 1 is intercepted. Also, in response to the movement of this optical system, the switch $S_2$ is closed immediately before the interception of the incident light. Thereupon, the charging voltage of the capacitor C is discharged through the switch $S_2$ and the voltage of the capacitor C becomes lower than the voltage at the terminal g. Accordingly, the output voltage of the comparator 6 assumes Lo level, and the output voltages of the AND gates 3, 4 and 5 also assume Lo level independently of the output voltages at the terminals a, b and c of the focus detecting unit 1. Accordingly, the driving circuit 2 is prevented from responding to the output of the focus detecting unit 1, and the focus adjusting operation is prevented from being effected by the output of the light-receiving portion in the light-intercepted condition. Thus, the phototaking lens which has been driven by the driver 2 is kept at a position determined by the output of the focus detecting unit 1 immediately before the incident light is intercepted.

Subsequently, exposure of the film is completed and the optical system for directing the object light to the light-receiving portion of the focus detecting unit 1 returns into the phototaking light path. Accordingly, the object light re-enters the light-receiving portion. However, for a little while after that, the focus detecting unit 1 is not stable. In response to the return of the optical system, the switch $S_2$ is again opened and the capacitor C begins to be charged through the resistor R. That is, the opening of the switch $S_2$ taking place in response to this re-entry of the object light provides the time count starting signal of the timer circuit. The charging voltage of the capacitor C, as indicated by the curve B in FIG. 3, is smaller than the output voltage A or A' of the terminal g of the focus detecting unit 1 before the time $T_1$ or $T_2$. Accordingly, the output of the comparator 6 remains at Lo level and thus, during the time $T_1$ or $T_2$, the outputs of the AND gates 3, 4 and 5 assume Lo level independently of the output of the focus detecting unit 1. During the time this focus detecting unit 1 is unstable, the driving circuit 2 is prevented from responding to the output of the focus detecting unit 1. After the focus detecting unit 1 has become stable, the charging voltage of the capacitor C becomes greater than the voltage at the terminal g and the output of the comparator 6 is inverted into Hi level and the driver 2 responds to the output of the focus detecting unit 1.

Again in this case, the time until the driver 2 responds to the output of the focus detecting unit 1 after the re-entry of the object light into the focus detecting light-receiving portion, namely, the operating time of the blocking circuit 3, 4, 5, 6, varies in accordance with the intensity of the object light just as in the case of the aforementioned closing of the main switch, that is, the time $T_2$ is short when the object light is intense and the time $T_1$ is long when the object light is weak.

If the object brightness becomes very low, the output of the focus detecting unit 1 becomes so poor in accuracy that it is no longer usable as the focus detection output, independently of time. Accordingly, even in such a case where the object brightness is so low that the focus detection output becomes unusable, it is useless to increase the count time $T_1$ or $T_2$ of the timer circuit R, C, 6 in accordance with the brightness. It is therefore preferable to determine the longest count time of the timer circuit on the basis of the above-mentioned low brightness for which the focus detection output becomes unusable.

On the other hand, even when the quick return mirror returns into the phototaking light path after exposure of the film has been completed, it vibrates for a predetermined time and correspondingly the light entering the focus detecting unit 1 also vibrates and thus, correct focus detection becomes impossible during the vibration. Accordingly, it is preferable to determine the shortest count time of the timer circuit on the basis of the predetermined time of this vibration.

In the above-described embodiment, the time from the start of the focus detecting operation till the start of the focus adjustment and display operation is continuously varied in accordance with the object brightness, but alternatively, this time may be varied discontinuously or stepwise.

The light-receiving element such as the photodiode $D_{21}$ of FIG. 2 which measures the intensity of the object light may be one exclusively for use for such purpose or may be common to the light-receiving element for focus detection. The timer circuit may also be a digital counter.

According to the present invention, as has been described above, after the focus detecting operation of the focus detecting unit has been started, the driving circuit is prevented from responding to the focus detecting unit for a short time if the object brightness is high or for a long time if the object brightness is low.

We claim:

1. An automatic focus detecting apparatus of a camera comprising:
   a focus detecting unit for receiving the light from an object to be photographed and producing a focus detection output;
   a driving circuit responsive to said focus detection output to effect the driving of at least one of a phototaking lens and a focus condition display;
   an object brightness detecting unit for producing a brightness detection output corresponding to the brightness of the object;
   means for producing a time count starting signal;
   a timer circuit adapted to start time count in response to said time count starting signal and produce a blocking signal in response to said brightness detection output for a short time if the brightness is high or for a long time if the brightness is low; and
   a blocking circuit for preventing said driving circuit from responding to said focus detection output during the time said blocking signal is produced.

2. An automatic focus detecting apparatus according to claim 1, wherein said means produces the time count starting signal in response to the start of the power supply to said focus detecting unit.

3. An automatic focus detecting apparatus according to claim 1, wherein said focus detecting unit is designed such that entry of the object light thereinto is intercepted during the opening of the shutter of the camera and entry of the object light thereinto is re-started after the closing the shutter, and said means produces the time count starting signal in response to the re-start of the entry of the object light.

4. An automatic focus detecting apparatus according to claim 3, wherein said means produces the time count starting signal also when the power supply to said focus detecting unit is started.

5. An automatic focus detecting apparatus according to claim 1, wherein the longest time during which the blocking signal of said timer circuit is produced is determined on the basis of the lowest object brightness which enables normal operation of said focus detecting unit.

* * * * *